(12) United States Patent
Dexheimer (10) Patent No.: US 11,600,456 B2
(45) Date of Patent: Mar. 7, 2023

(54) ACTUATION UNIT FOR A HOUSEHOLD APPLIANCE

(71) Applicant: De'Longhi Braun Household GmbH, Neu-Isenburg (DE)

(72) Inventor: Christian Dexheimer, Langen (DE)

(73) Assignee: De'Longhi Braun Household GmbH, Neu-Isenburg (DE)

( * ) Notice: Subject to any disclaimer, the term of this patent is extended or adjusted under 35 U.S.C. 154(b) by 113 days.

(21) Appl. No.: 17/051,196

(22) PCT Filed: May 6, 2019

(86) PCT No.: PCT/EP2019/061537
§ 371 (c)(1),
(2) Date: Oct. 28, 2020

(87) PCT Pub. No.: WO2019/219429
PCT Pub. Date: Nov. 21, 2019

(65) Prior Publication Data
US 2021/0233723 A1    Jul. 29, 2021

(30) Foreign Application Priority Data

May 15, 2018    (DE) .................... 10 2018 207 507.7

(51) Int. Cl.
*H01H 15/02*    (2006.01)
*H01H 13/08*    (2006.01)
*A47J 43/044*   (2006.01)

(52) U.S. Cl.
CPC ............ *H01H 13/08* (2013.01); *A47J 43/044* (2013.01); *A47J 2043/04427* (2013.01); *H01H 2231/012* (2013.01)

(58) Field of Classification Search
CPC ...... H01H 3/125; H01H 13/705; H01H 13/14; H01H 13/04; H01H 13/10; H01H 13/70;
(Continued)

(56) References Cited

U.S. PATENT DOCUMENTS 4,179,644 A    12/1979  Vassos
4,937,705 A     6/1990  Piber
(Continued)

FOREIGN PATENT DOCUMENTS

DE    10 2008 040 934 A1    2/2010
EP         2 962 609 A1     1/2016
(Continued)

OTHER PUBLICATIONS

English translation of Official Communication Japanese Patent Office dated Jan. 4, 2022, in corresponding parallel Japanese application JP 2020-563898.
(Continued)

*Primary Examiner* — Ahmed M Saeed
(74) *Attorney, Agent, or Firm* — Scott R. Cox (57) ABSTRACT

An actuation unit for a household appliance, preferably an electrically drivable, household appliance, includes an actuation element, having an actuation element base. The actuation element has a protrusion portion extending from the actuation element base, which is inserted into a recess of an actuation button, such that the actuation element and the actuation button have, in an assembled state, a degree of freedom in a direction corresponding to the extension of the protrusion portion and in a further direction.

17 Claims, 7 Drawing Sheets

(58) Field of Classification Search
CPC ............ H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20
See application file for complete search history.

(56) References Cited

U.S. PATENT DOCUMENTS

| | | | |
|---|---|---|---|
| 6,246,019 B1 * | 6/2001 | Nakamura | H01H 25/041 200/6 A |
| 2008/0011590 A1 * | 1/2008 | Montalvo | H01C 10/50 200/11 R |
| 2020/0006020 A1 * | 1/2020 | Ito | H01H 13/7006 |

FOREIGN PATENT DOCUMENTS

| | | |
|---|---|---|
| EP | 3 138 450 A1 | 3/2017 |
| EP | 3 054 825 B1 | 5/2017 |
| JP | S49-019273 U | 2/1974 |

OTHER PUBLICATIONS

English Translation of International Search Report with Written Opinion of the International Searching Authority, dated Sep. 5, 2019, with respect to International Application No. PCT/EP2019/061537.

English Translation of International Preliminary Report on Patentability of the International Searching Authority, dated Nov. 17, 2020, with respect to International Application No. PCT/EP2019/061537.

Official Communication Russian Patent Office dated Mar. 19, 2021, in corresponding parallel RU application—PCT/EP2019/061537—cited only for references disclosed therein. Other non-cited references previously disclosed.

* cited by examiner

ACTUATION UNIT FOR A HOUSEHOLD APPLIANCE

TECHNICAL FIELD

The invention relates to an actuation unit for a household appliance and a, preferably electrically drivable, household appliance, in particular a hand-held household appliance such as a stick blender, a hand mixer or a hand blender. The invention further relates to a method of assembling a household appliance.

PRIOR ART

In known stick blenders, a subassembly comprising a motor for driving the stick blender, a circuit board and a plastic ring supporting the motor and the circuit board is inserted from one side into a housing of the stick blender and then connected to the housing by ultrasonic welding. The welded connection is formed between the plastic ring of the subassembly and the housing.

Some stick blenders are characterized in that they have a speed adjustment by means of a potentiometer, which corresponds to the actuation path. To implement this function, both the main switch is pressed and the potentiometer is actuated by moving the actuation button of the stick blender.

The plurality of components installed in such a stick blender leads to long tolerance chains. Due to the system, for example, the tolerance gap to be considered for production is in the region of the actuation or the actuation button.

To keep tolerance chains on the circuit board small, it is known to form an assembly from an actuation element for the main switch and the potentiometer as well as a corresponding guide and to pin this assembly to the circuit board. This ensures that both the main switch and the potentiometer can always be switched reliably. Thus, the tolerance gap is shifted to the interface between the housing and the actuation button.

Since all components in the chain are subject to tolerances, tolerance compensation must be effected by a component that can be varied in vertical directions (when viewing the stick blender in the upright position), which is aligned manually and then locked by means of a screw connection. In particular, tolerance compensation can be achieved when assembling the actuation button which is arranged on mounting parts of the circuit board accommodated in the housing.

The actuation button is equipped with an elongated hole oriented in the direction of the largest tolerance movement and, after completion of the welded connection, is inserted into the assembly and manually aligned on the actuation element sitting on the circuit board. Once the actuation button is aligned with respect to the housing, it is screwed onto the actuation element by a screw and thus fixed.

However, this procedure has the disadvantage that a screw connection must be provided for assembly. This leads to a certain susceptibility to errors and, due to the manual assembly by means of a screw, also to increased production costs.

SUBJECT MATTER OF THE INVENTION

The invention aims at providing an actuation unit for a household appliance which simplifies the assembly of a household appliance and contributes to reducing the production costs.

The subject matter of claim 1 provides a corresponding actuation unit. Further preferred embodiments are specified in the dependent claims and/or described below.

The actuation unit is suitable for a household appliance, for example a stick blender, a hand mixer or a hand blender, and comprises: a circuit board on which a first switching element is provided, as well as an actuation button having a recess which is in particular formed as an elongated hole. Moreover, an actuation element having an actuation element base is provided, wherein the actuation element has a protrusion portion extending from the actuation element base, which is inserted into the recess such that the actuation element and the actuation button have, in the assembled state, a degree of freedom in a dimension corresponding to the extension of the protrusion portion and in a further dimension.

In this respect, "in the assembled state" means that the actuation button is aligned with respect to the actuation element such that the first switching element (and, if necessary, a second switching element described later) can be actuated. In particular, the protrusion portion touches one region or two opposite regions of the recess.

The arrangement according to the invention simplifies the assembly since the relative alignment of the actuation element and the actuation button can be varied, when placing the actuation button, without negatively affecting the function of the actuation unit. Thus, tolerance compensation can be achieved, and therefore the assembly risk can be reduced. Moreover, complex screwing is not necessary.

The recess specified in the preferred embodiment is formed as an elongated hole. Such a recess can also be designated as a "fork-shaped recess". Through such a recess, the protrusion portion in the elongated hole can be moved back and forth.

According to one embodiment, it is provided that the actuation element has a sliding portion, the sliding portion being configured to actuate a switching component of the first switching element by a sliding movement. Through the switching component, a motor can be switched on or off, for example.

It is preferred that the protrusion portion extends from a side of the actuation element, which is opposite of the sliding portion. This simplifies the assembly of the device and leads to a flawless operating option during use.

In a further variant, the protrusion portion can be configured as a cylindrical pin. This simplifies the insertion into the recess of the actuation button and ensures flawless operation. In this respect, the tip of the protrusion portion, which faces away from the actuation element base, can be conical in order to further simplify the assembly.

It is preferred that the two degree-of-freedom directions of the actuation element and the actuation button are aligned perpendicularly to the actuation direction of the actuation button. If the household appliance comprising the actuation unit is arranged upright, these are vertical and horizontal directions.

According to one embodiment, it is provided that a second switching element is provided on the circuit board, it being preferred that the second switching element is a potentiometer. Thus, in addition to the function of switching on and off, the speed of the motor can also be continuously adjusted.

It is preferred that the actuation element is configured to actuate the first switching element and the second switching element. Thus, several functions are combined in one actuation movement.

The invention further relates to a household appliance. The household appliance comprises a housing body and an actuation unit according to one of the previous aspects, wherein the actuation button for actuating a motor of the household appliance is accommodated in an opening region of the housing body. As regards the advantages of the household appliance, reference is made to the advantages already explained above.

The household appliance can be a stick blender, a hand mixer or a hand blender.

The invention further relates to a method of assembling a household appliance, in particular a household appliance according to one of the aforementioned aspects. The method comprises the following steps: Within the scope of the method, it is provided that a circuit board provided with a first switching element and an actuation element is inserted into a housing body, wherein the actuation element has a protrusion portion extending from the actuation element base, and wherein the protrusion portion is inserted into a, particularly fork-shaped, recess of an actuation button, so that the actuation element and the actuation button can be aligned in two dimensions relative to each other when being assembled. As regards the advantages of the method, reference is made to the advantages already explained above.

DESCRIPTION OF THE PREFERRED EMBODIMENT

For illustration purposes, preferred embodiments of the invention will be described by means of the enclosed figures. Although the described embodiment is not restrictive but purely exemplary, features of the embodiments can also be used individually to specify the invention. Modifications of certain features of the preferred embodiments can be combined with variants of other features in order to form further embodiments.

Figure 1:
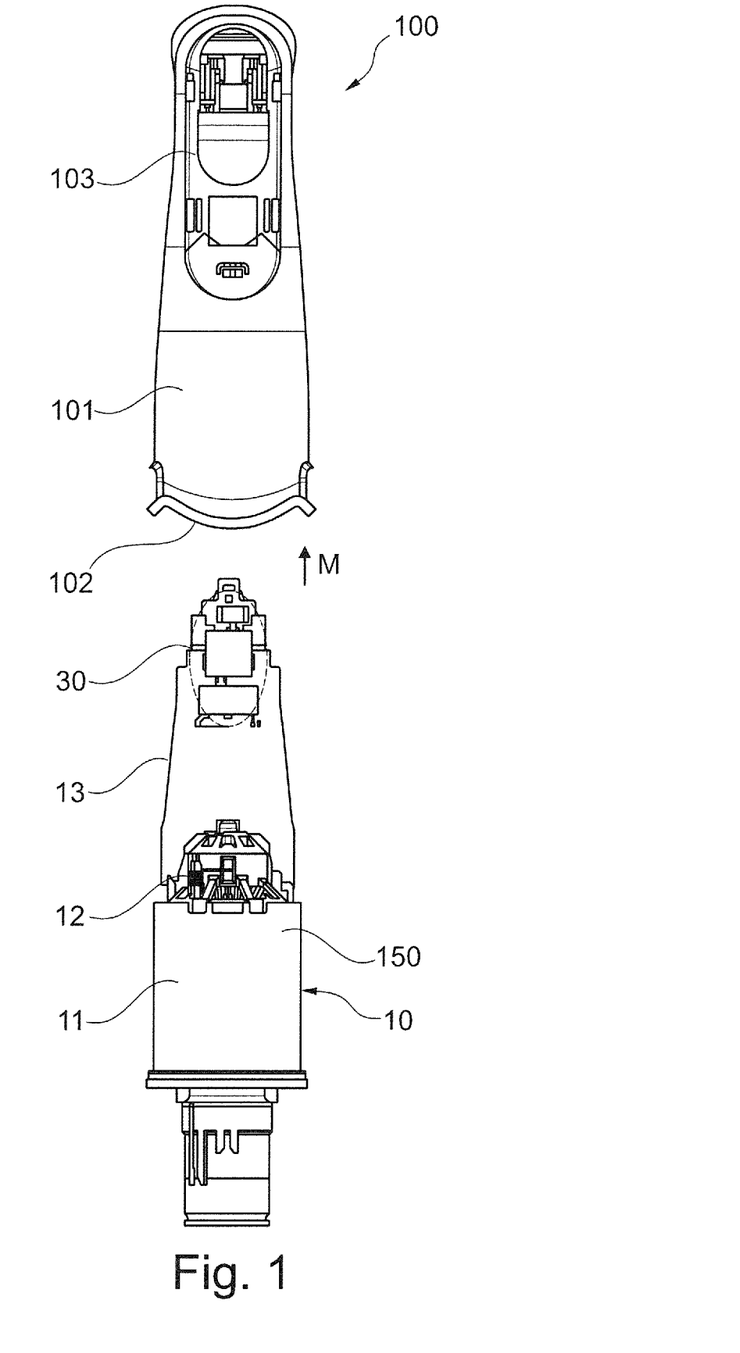
FIG. 1 shows a household appliance according to the invention before insertion of a subassembly into a housing body of the household appliance.
Figure 2:
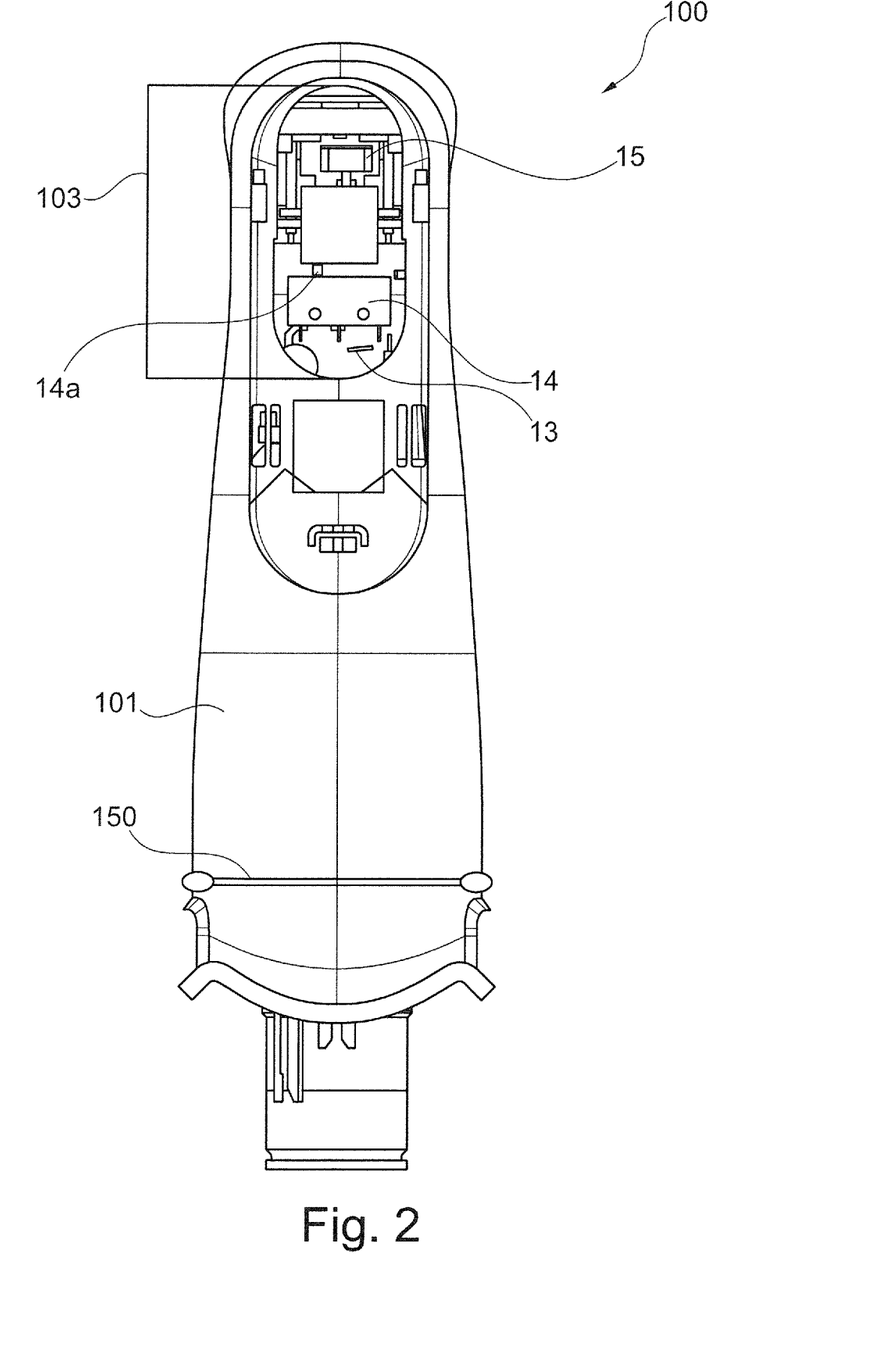
FIG. 2 shows the household appliance according to the invention after insertion of the subassembly into the housing body of the household appliance.

To explain the embodiments of the actuation unit, a household appliance and its assembly will be explained first by means of FIGS. 1 to 2.

The household appliance 100, according to the present embodiment a stick blender, comprises a housing body 101. The housing body 101, which is manufactured in particular by injection molding, comprises an assembly opening 102, into which an assembly 10 can be inserted in an assembly direction M, as described below. Moreover, an opening region 103 is provided on the housing body 101, into which an actuation button 110 can be placed. In FIGS. 1 to 2, the actuation button 110 is not yet assembled.

The assembly 10 to be inserted into the housing body 101 in the assembly direction M comprises a support component 11 (in particular a plastic ring), on which a motor 12 is provided for driving a stick blender.

Moreover, a circuit board 13 is mounted on the support component 11, on which a plurality of electronic components is provided. In particular, a main switch 14 (first switching element) is mounted on the circuit board 13, the main switch 14 comprising a switching component 14a. In addition, a potentiometer (second switching element) 15 is provided on the circuit board 13, by means of which the speed of the motor 12 can be adjusted. The potentiometer 15 comprises a switching component 15a, by means of which a corresponding adjustment movement of the potentiometer 15 can be made in order to be able to continuously adjust the speed of the motor 12.

When assembling the household appliance, the assembly 10 is inserted into the assembly opening 102 in the assembly direction M, so that an actuation region 30, in which the main switch 14 and the potentiometer 15 are located, reaches the portion of the opening region 103 and is thus accessible from outside the housing body 101.

After the assembly 10 has been inserted into the housing body 101, the housing body 101 is connected to the support component by means of a weld seam 150 lying within the housing body 101. The position of the weld seam 150 is illustrated in FIG. 2.

Figure 3:
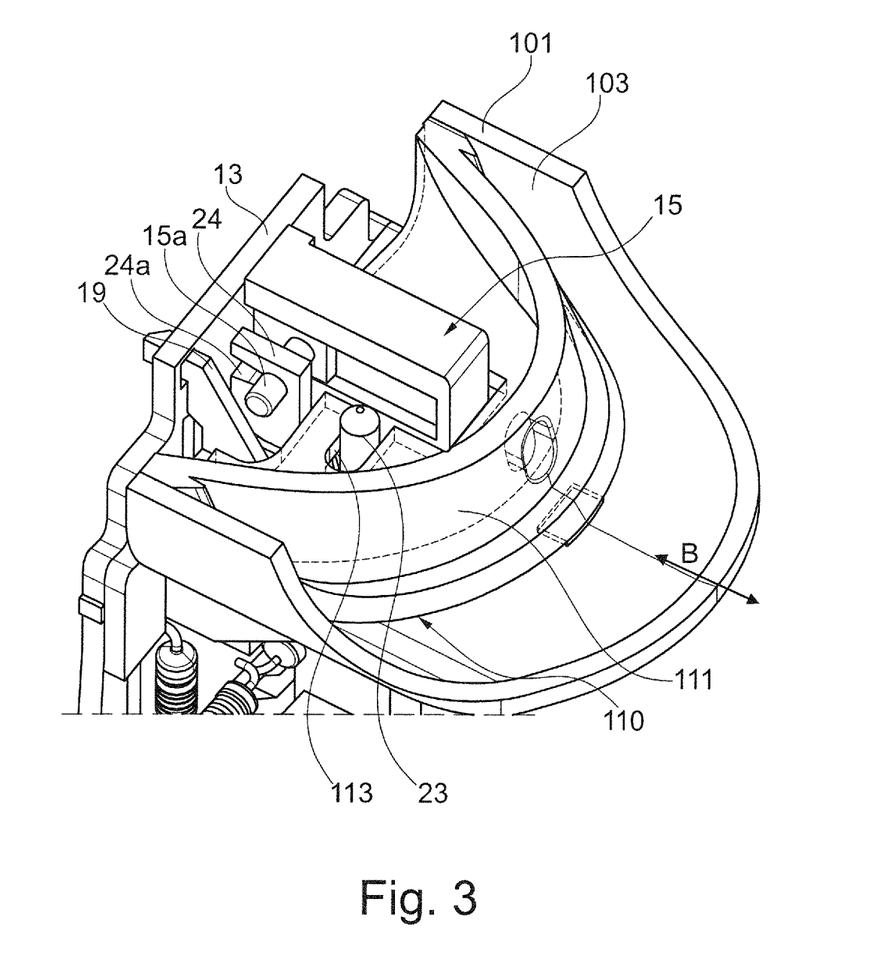
FIG. 3 is a perspective sectional view to illustrate the actuation region of the household appliance according to a first embodiment of the invention.
Figure 4:
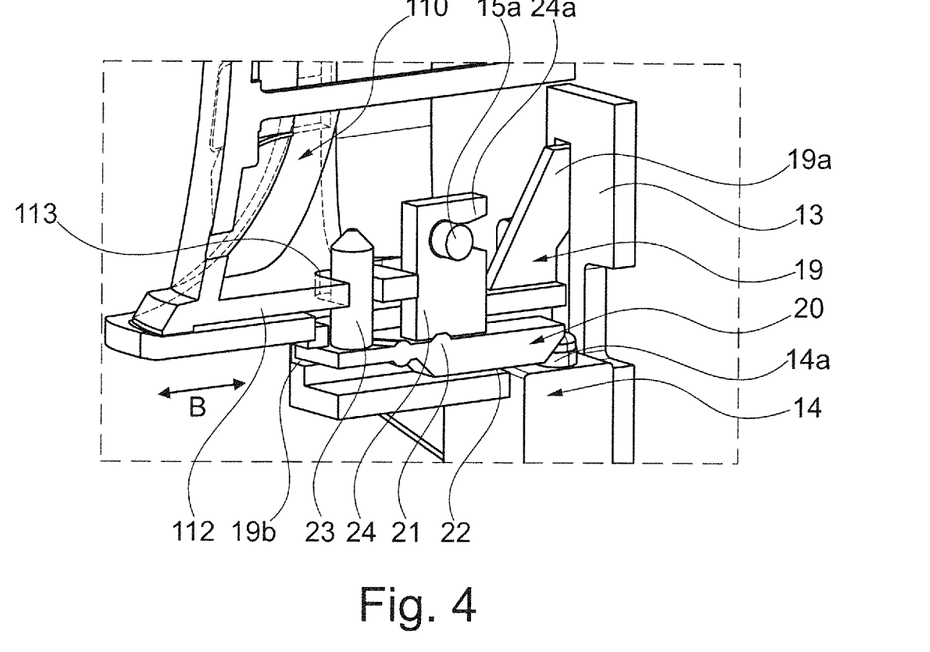
FIG. 4 is a further perspective sectional view of the first embodiment to illustrate the actuation region of the household appliance, an actuation button being arranged in a starting position.
Figure 5:
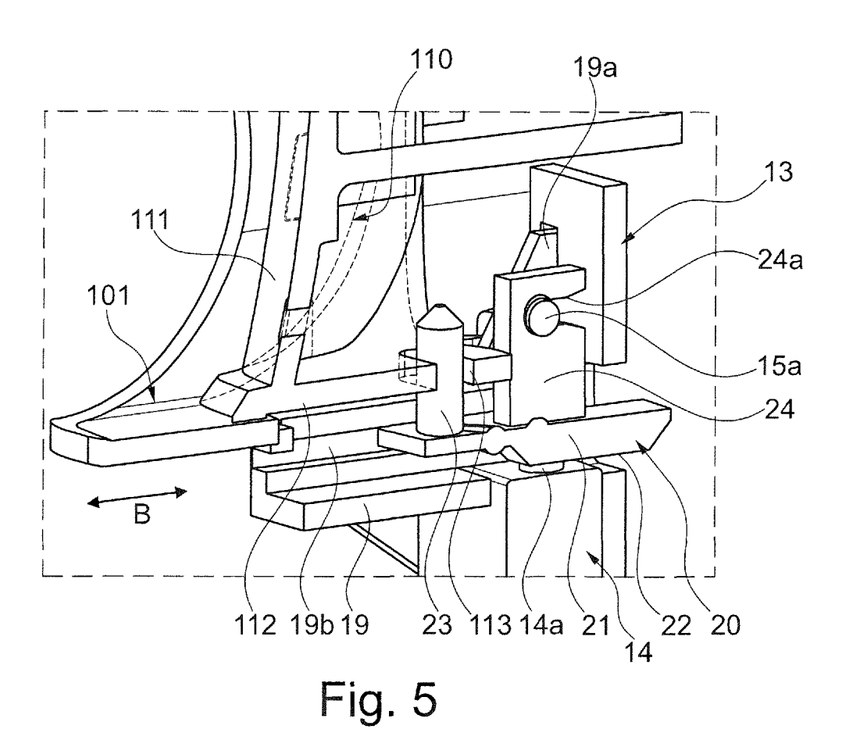
FIG. 5 is the further perspective sectional view of the first embodiment to illustrate the actuation region of the household appliance, the actuation button being arranged in an actuation position.

With reference to FIGS. 3 to 5, the structure of the embodiment of the actuation unit will be explained. A base 19 is mounted on the circuit board 13, the base 19 in the embodiment example being configured as an injection molded part. The base 19 has a connection portion 19a which is guided through an opening in the circuit board 13, so that the base 19 can be fixed to the circuit board 13. The base 19 further has a guide portion 19b that is provided in this embodiment example as a recess in the base 19, which is U-shaped in cross section. The guide portion 19b extends perpendicularly to the assembly direction M.

An actuation element 20 is accommodated in the guide portion 19b, which can be moved back and forth along the guide 19b in an actuation direction B. The actuation element 20 has an actuation element base 21, on the side of which that faces in the direction of the main switch 14 a sliding portion 22 is provided. The sliding portion 22 can be moved along the guide 19b and in the direction of the first switching component 14a of the main switch 14. In the direction facing the first switching component 14a, the sliding portion 22 has an inclination, so that the first switching component 14a can be pressed smoothly by the actuation element 20.

Moreover, the actuation element 20 has a protrusion portion 23 which extends, starting from the actuation element base 21, perpendicularly to the plane formed by the actuation element base 21 (corresponding to the aforementioned assembly direction M). The tip of the protrusion portion 23, which faces away from the actuation element base 21, is preferably conical in order to further simplify the assembly.

In the embodiment example, the protrusion portion 23 is configured cylindrically. However, according to a further modification, the protrusion portion 23 can also have a different geometry, such as a rectangular or square shape in cross section.

Moreover, an engagement portion 24 extends starting from the actuation element base 21. The engagement portion 24 on the actuation element base 21 is configured closer to the circuit board 13 than the protrusion portion 23. The engagement portion 24 has an accommodating region 24a which is open in the direction of the circuit board 13, the accommodating region 24a being provided to accommodate the switching component 15a of the potentiometer 15.

In the opening region 103, the actuation button 110 is inserted such that the fork-shaped recess 113 of the actuation button 110 accommodates the protrusion portion 23. Since the protrusion portion 23 extends through the fork-shaped recess 113 of the actuation button 110, it is possible to compensate for tolerances in the region of the actuation button 110 during assembly. In this respect, tolerance compensation takes place both in the assembly direction M and in a direction which lies in the plane of the upper side of the actuation element 20.

An actuation of the household appliance 100 by movement of the actuation button 110 is clearly illustrated by means of FIGS. 4 and 5.

In FIG. 4, the actuation button 110 is in the starting position. If by movement of the actuation button 110 in the actuation directions B the actuation button 110 is moved in the direction of the circuit board 13, this movement of the actuation button 110 causes a transfer of the actuation element 20. In this respect, the switching component 14a of the main switch 14 is actuated after a certain path of the actuation element 20 along the guide portion 19b, so that the motor 12 of the household appliance 100 is started.

By a further movement of the actuation button 110 and thus of the actuation element 20 in the actuation directions B, the switching component 15a of the potentiometer is also moved, so that the speed of the motor 12 is adjusted.

A second embodiment will be explained in more detail by means of FIGS. 6 to 7. Similar to the first embodiment, the embodiment shown in FIGS. 6 to 7 can be provided in a household appliance 100 according to FIGS. 1 to 2. The corresponding components are provided with similar reference numbers. In particular, the household appliance of the second embodiment comprises a housing body 101', in which a circuit board 13' is accommodated.

The housing 101' is preferably configured like the housing 101 of the first embodiment, which is why for the description of the housing 101' and its components reference is made to the explanations on the housing 101 of the first embodiment.

The second embodiment essentially differs from the first embodiment in that an engagement portion 24' has an accommodating region 24a' which is open in a dimension parallel to the assembly direction M. Thus, a switching component 15a' of a potentiometer 15', when inserted in the assembly direction M (see, for example, also FIG. 2), can be inserted into the accommodating region 24a' of the engagement portion 24'. In the upright position of the household appliance, the accommodating region 24a' is therefore open to the top. Further components are implemented in a similar manner to the first embodiment, which is why reference is also made to the previous explanations.

In particular, a base 19' is fixed to the circuit board 13'. The base 19' has a guide portion 19b' which forms a U-shaped recess in the base 19'. The guide portion 19b' extends perpendicularly to the assembly direction M. Also in this regard, reference is made to the explanations on the first embodiment.

An actuation element 20' is accommodated in the guide portion 19b', wherein the actuation element 20' can be moved back and forth along the guide 19b' in an actuation direction B.

The actuation element 20' has an actuation element base 21', provided on the side of which that faces in the direction of a main switch 14', which is arranged in a similar manner to FIG. 4 of the first embodiment, is a sliding portion. The sliding portion not shown in the figures of the second embodiment is configured as in FIG. 4 of the first embodiment. The sliding portion can be moved along the guide and in the direction of a first switching component 14a' of the main switch 14'. In the course of this movement, the actuation element 20' can trigger the switching component 14a' and thus activate the main switch 14'.

Moreover, the actuation element 20' has a protrusion portion 23' which extends, starting from the actuation element base 21', perpendicularly to the plane formed by the actuation element base 21' (corresponding to the aforementioned assembly direction M). The tip of the protrusion portion 23', which faces away from the actuation element base 21', is preferably conical in order to further simplify the assembly.

In the embodiment example, the protrusion portion 23' is configured cylindrically. However, according to a further modification, the protrusion portion 23' can also have a different geometry, such as a rectangular or square shape in cross section.

The engagement portion 24' extends starting from the actuation element base 21'. The engagement portion 24' on the actuation element base 21' is configured closer to the circuit board 13' than the protrusion portion 23'. The accommodating region 24a' is open in the direction facing away from the actuation element base 21', the accommodating region 24a' being provided to accommodate the switching component 15a' of the potentiometer 15'.

In the opening region 103', the actuation button 110' is inserted such that the fork-shaped recess 113' of the actuation button 110' accommodates the protrusion portion 23'. Since the protrusion portion 23' extends through the fork-shaped recess 113' of the actuation button 110', it is possible to compensate for tolerances in the region of the actuation button 110' during assembly. In this respect, tolerance compensation takes place both in the assembly direction M and in a direction which lies in the plane of the upper side of the actuation element 20'.

Figure 6:
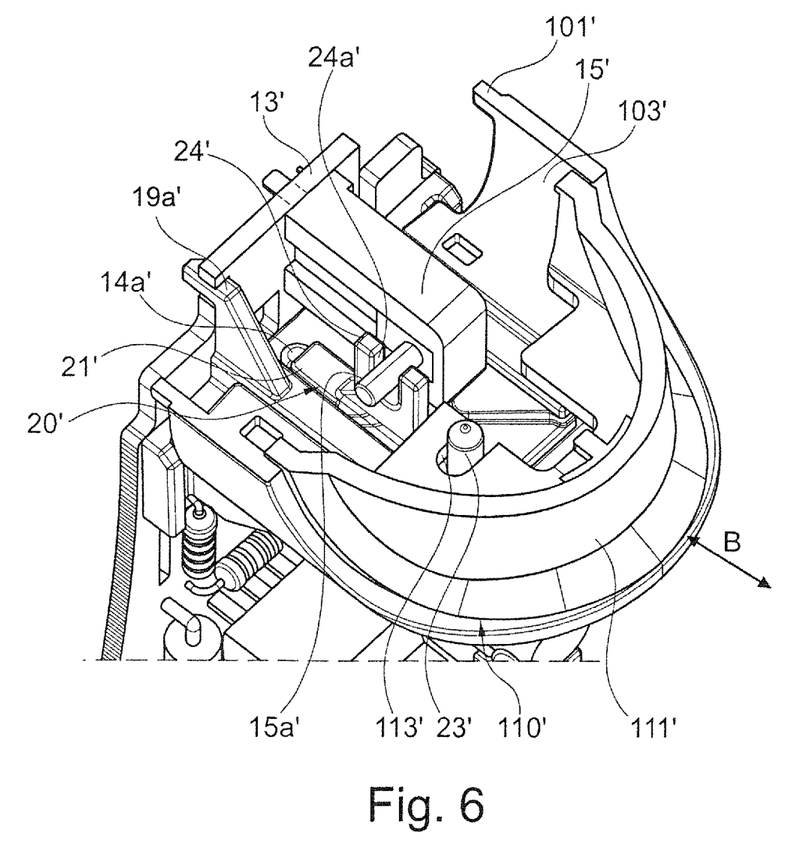
FIG. 6 is a perspective sectional view to illustrate the actuation region of the household appliance according to a second embodiment of the invention.
Figure 7:
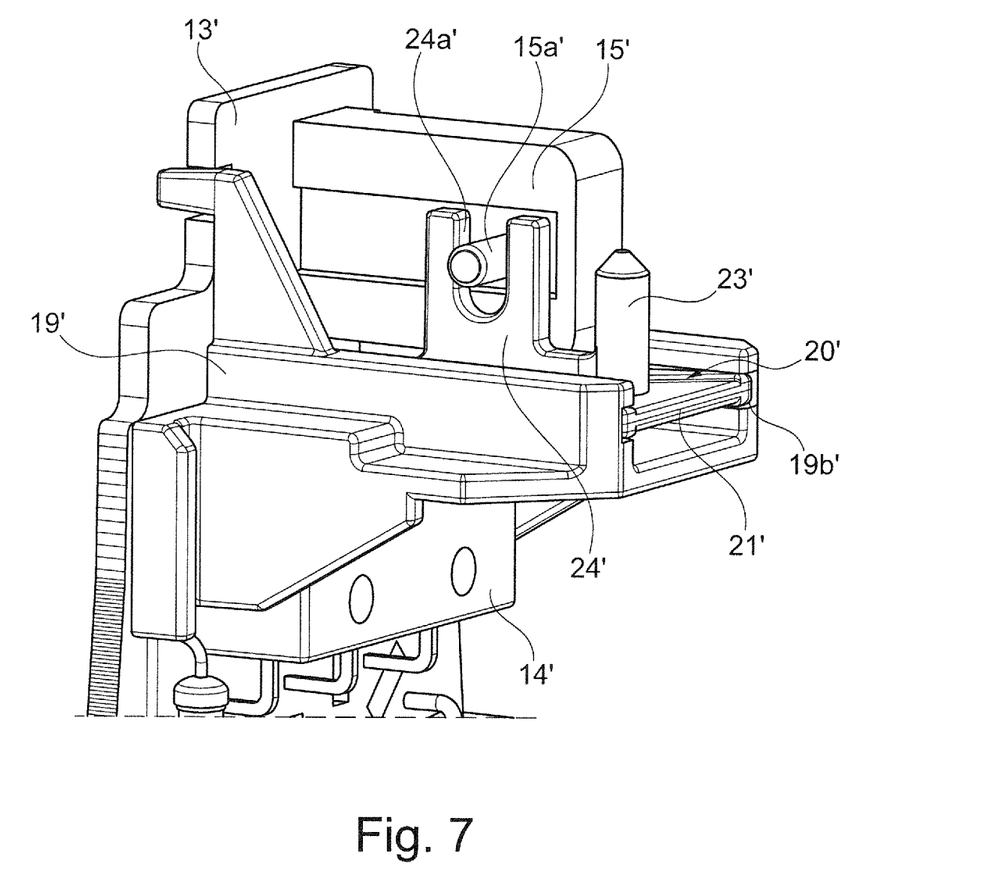
FIG. 7 shows a detailed view of the second embodiment.

In FIG. 6, the actuation button 110' of the second embodiment is in a starting position. If the actuation button 110' is moved in the direction of the circuit board 13, this movement of the actuation button 110' causes a transfer of the actuation element 20' in the corresponding direction. In this respect, the switching component 14a' of the main switch 14' is actuated after a certain path of the actuation element 20' along the guide portion 19b', so that the motor of the household appliance is started.

By a further movement of the actuation button 110' and thus of the actuation element 20' in the actuation directions B, the switching component 15a' of the potentiometer is also moved, so that the speed of the motor is adjusted.

It is apparent that features of the first and second embodiments can be combined with each other in order to form further embodiments.

Although the present invention was described in the context of a stick blender, it is apparent that the household appliance 100 can also be configured as a hand mixer, a hand blender or the like.

The invention claimed is:

1. An actuation unit for a household appliance, comprising:
    a circuit board, wherein a first switching element is provided on the circuit board,
    an actuation button having a recess, and
    an actuation element comprising an actuation element base and a protrusion portion extending from the actuation element base, wherein the protrusion portion is inserted into the recess of the actuation button,
    wherein the actuation element and the actuation button have, in an assembled state, a degree of freedom of movement in a direction corresponding to an extension of the protrusion portion and in a further direction and are fixed relative to each other in a direction perpendicular to an extension direction,
    wherein the actuation element with the protrusion portion is fixed in movement laterally in an actuation direction relative to the actuation button; and,
    wherein the actuation element further comprises a sliding portion, wherein a lateral movement of the sliding portion actuates a switching component of the first switching element by a sliding movement.

2. The actuation unit according to claim 1, wherein the protrusion portion extends from a side of the actuation element which is opposite of the sliding portion.

3. The actuation unit according to claim 1, wherein the protrusion portion comprises a cylindrical pin.

4. The actuation unit according to claim 1, characterized in that the actuation element further comprises an engagement portion, extending from the actuation element base, and an accommodating region to receive a switching component of a second switching element.

5. The actuation unit according to claim 4, wherein the engagement portion extends in the same direction from the actuation element base as the protrusion portion.

6. The actuation unit according to claim 4, wherein the accommodating region is open in an actuation direction to accommodate the switching component of the second switching element.

7. The actuation unit according to claim 6, further comprising a base mounted on the circuit board, wherein the base comprises a guide portion, wherein the guide portion of the base comprises a recess extending in the actuation direction, wherein the actuation element base is accommodated in sections.

8. The actuation unit according to claim 7, characterized in that the base further comprises at least one connection portion, which is inserted into an opening of the circuit board.

9. The actuation unit according to claim 6, wherein two degree-of-freedom directions of the actuation element and the actuation button are aligned perpendicularly to the actuation direction of the actuation button.

10. The actuation unit according to claim 1, wherein a second switching element is provided on the circuit board.

11. The actuation unit according to claim 4, wherein the actuation element actuates the first switching element and the second switching element.

12. A household appliance, comprising a housing body and the actuation unit according to claim 1, wherein the actuation button for actuating a motor of the household appliance is accommodated in an opening region of the housing body.

13. The household appliance according to claim 12, wherein the household appliance is selected from the group consisting of a stick blender, a hand mixer and a hand blender.

14. A method of assembling the household appliance of claim 12 comprising
    inserting the circuit board provided with the first switching element and the actuation element, into the housing body, wherein the protrusion portion of the actuation element extends from the actuation element base, and
    inserting the protrusion portion into recess of the actuation button, so that the actuation element and the actuation button are aligned in two directions relative to each other when being assembled.

15. The actuation unit according to claim 10 wherein the second switching element comprises a potentiometer.

16. The actuation unit according to claim 1 wherein the recess is formed as an elongated hole.

17. The method according to claim 14 wherein the recess is fork-shaped.

* * * * *